(12) United States Patent
Chew

(10) Patent No.: US 6,631,053 B1
(45) Date of Patent: Oct. 7, 2003

(54) ACTUATOR PIVOT ASSEMBLY THAT PIVOTALLY CONNECTS AN ACTUATOR TO A BASE OF A DISK DRIVE

(75) Inventor: David W. Chew, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 241 days.

(21) Appl. No.: 09/669,131

(22) Filed: Sep. 26, 2000

Related U.S. Application Data

(60) Provisional application No. 60/156,430, filed on Sep. 28, 1999.

(51) Int. Cl.[7] .................................................. G11B 5/55
(52) U.S. Cl. ........................ 360/265.6; 360/265.4; 360/265.7; 360/266.1
(58) Field of Search ........................... 360/265.2, 265.4, 360/265.5, 265.6, 265.7, 266.1

(56) References Cited

U.S. PATENT DOCUMENTS

| | | | | |
|---|---|---|---|---|
| 4,391,035 A | * | 7/1983 | Van de Bult | 29/603.06 |
| 4,713,703 A | * | 12/1987 | Asano | 360/265.6 |
| 5,305,169 A | * | 4/1994 | Anderson et al. | 310/36 |
| 5,355,268 A | * | 10/1994 | Schulze | 360/265.2 |
| 5,452,151 A | * | 9/1995 | Money et al. | 360/75 |
| 5,579,190 A | * | 11/1996 | Mastache et al. | 360/265.6 |
| 5,659,445 A | * | 8/1997 | Yoshida et al. | 310/90 |
| 5,729,406 A | * | 3/1998 | Faris | 360/265.7 |
| 5,786,963 A | * | 7/1998 | Malek | 360/264.3 |
| 5,808,839 A | * | 9/1998 | Dunfield et al. | 360/265.4 |
| 6,078,475 A | * | 6/2000 | Lawson | 360/265.2 |
| 6,288,879 B1 | * | 9/2001 | Misso et al. | 360/265.6 |
| 6,424,503 B1 | * | 7/2002 | Chin et al. | 360/265.2 |
| 6,487,053 B1 | * | 11/2002 | Matsumura et al. | 360/265.7 |

\* cited by examiner

*Primary Examiner*—Jefferson Evans
(74) *Attorney, Agent, or Firm*—David M. Sigmond; Michael G. Smith

(57) ABSTRACT

A disk drive includes an actuator with a shaft and a base with a sleeve that receives the shaft and includes as least one bearing. The shaft extends into the sleeve and through the bearing where it supports the actuator and allows it to pivot in response to electro-magnetic forces. The shaft defines at least one opening for aligning a main body of the actuator together with the shaft and facilitating attachment of the two in proper and secure alignment.

60 Claims, 2 Drawing Sheets

ACTUATOR PIVOT ASSEMBLY THAT PIVOTALLY CONNECTS AN ACTUATOR TO A BASE OF A DISK DRIVE

RELATED APPLICATIONS

The present application claims priority under 35 U.S.C. §119(e) from U.S. Provisional Patent Application Serial No. 60/156,430, filed Sep. 28, 1999, which provisional application is incorporated herein by reference in its entirety.

BACKGROUND OF THE INVENTION

1. Field of the Invention

The present invention relates to disk drives for mass storage of information in computer systems, and more particularly to an actuator pivot assembly that pivotally connects an actuator to a base of a disk drive.

2. Description of the Prior Art

The prior art includes a variety of disk drives used for information storage in computer systems. Some of these disk drives are rigid-type magnetic recording devices that typically include a stack of magnetic disks mounted on a rotatable spindle. An actuator controls an array of transducers that write and read binary digital information on the disks. The actuator rotates about a pivot in response to electromagnetic forces generated by a voice coil motor and places the transducers in desired positions.

The constructions currently used to pivotally connect the actuators to the base or housing of a disk drive are complex arrangements suited for multi-level actuators used with stacked arrangements of disks. These constructions include a stationary shaft fixedly secured to a base and a rotatable sleeve fixedly secured to the actuator. They do not allow easy connection of a simple, planar actuator structure.

SUMMARY OF THE INVENTION

The present invention includes a shaft on an actuator and a sleeve on a base. In accordance with one embodiment of this invention, a disk drive includes an actuator with a shaft and a base with a sleeve. The sleeve includes at least one bearing. The sleeve receives the shaft. The shaft extends into the sleeve and through the bearing. The shaft supports the actuator and allows the actuator to pivot in response to electromagnetic forces. The shaft is a separate member that defines at least one opening. The opening aligns a main body of the actuator with the shaft. The opening facilitates the attachment of the main body of the actuator to the shaft in proper and secure alignment. The actuator pivot assembly of the present invention allows easy attachment of a simple planar actuator to a base. The actuator pivot assembly is a simple construction that minimizes the expense of fabrication while providing consistent and precise performance.

BRIEF DESCRIPTION OF THE DRAWINGS

For a more complete understanding of this invention, one should now refer to the embodiment illustrated in greater detail in the accompanying drawings and described below by way of an example of the invention. In the drawings.

While the following disclosure describes the invention in connection with one embodiment and a modification, one should understand that the invention is not limited to this embodiment. Furthermore, one should understand that the drawings are not to scale and that graphic symbols, diagrammatic representatives, and fragmentary views, in part, may illustrate the embodiment. In certain instances, the disclosure may not include details that are not necessary for an understanding of the present invention such as conventional details of fabrication and assembly.

DETAILED DESCRIPTION OF THE DRAWINGS

Figure 1:
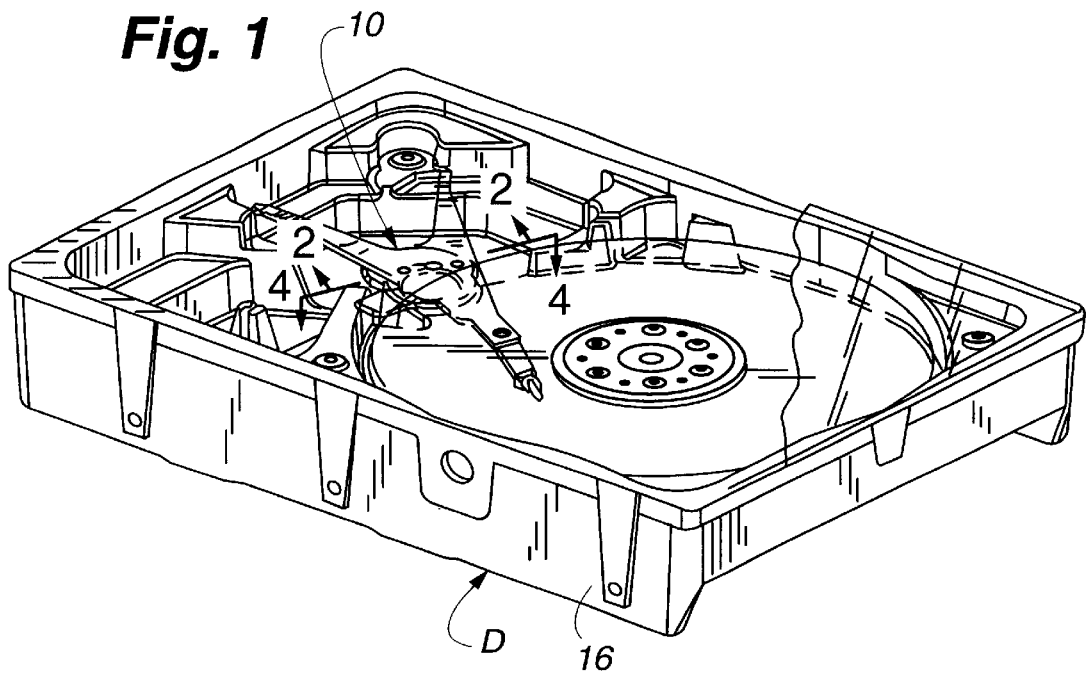
FIG. 1 is a partial perspective view of a disk drive that includes an actuator pivot assembly of the present invention.
Figure 2:
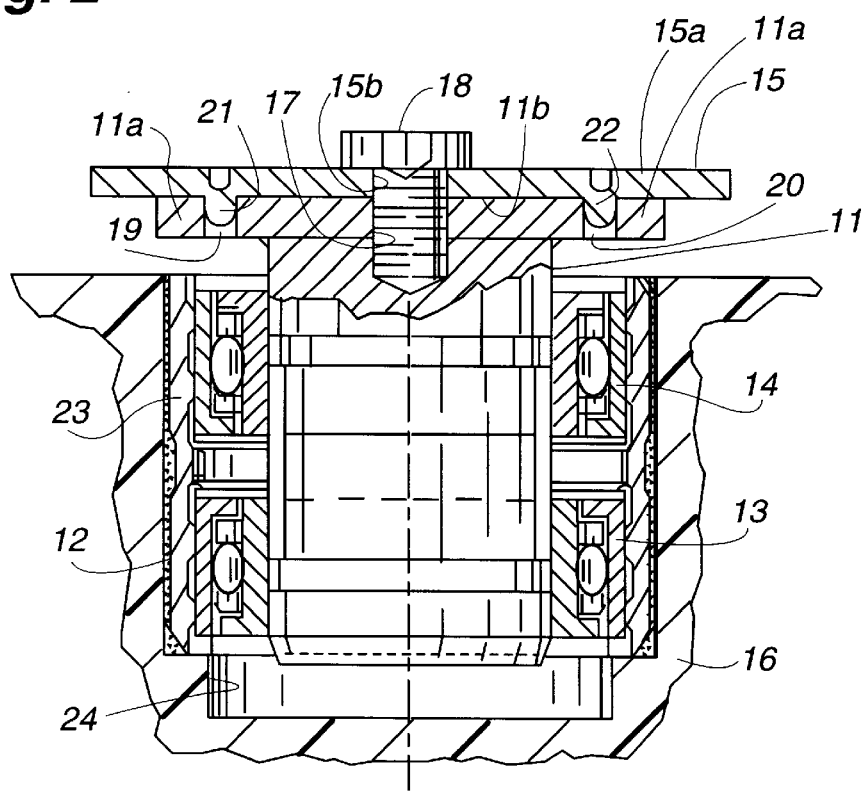
FIG. 2 is a sectional view taken along line 2—2 in FIG. 1.
Figure 3:
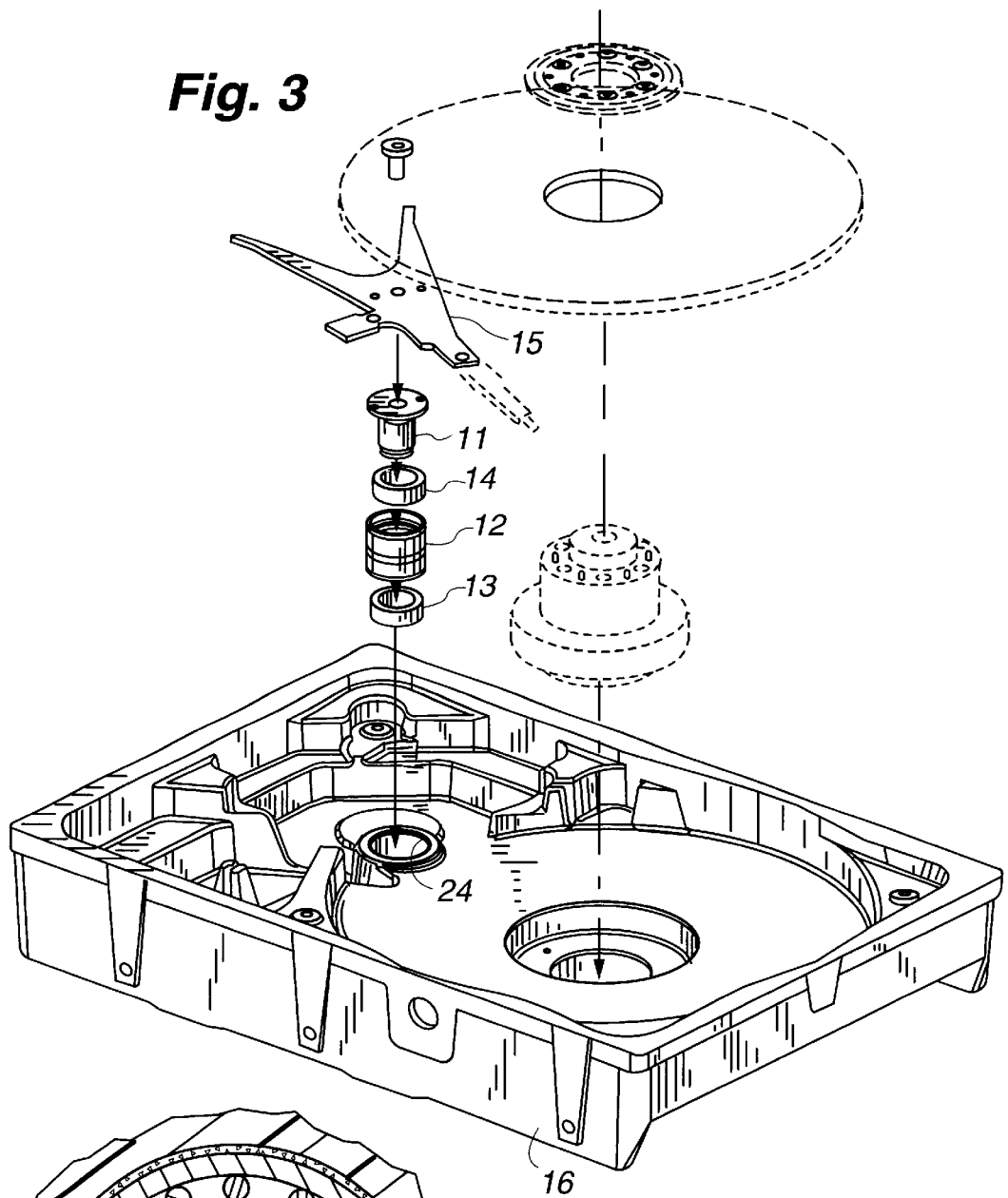
FIG. 3 is an exploded perspective view of the pivot assembly of the present invention.

Turning now to the drawings and referring specifically to FIGS. 1 and 2, the actuator pivot assembly 10 of the present invention generally includes a shaft 11 and a sleeve 12 with a pair of miniature ball bearings 13 and 14. These components pivotally connect an actuator 15, including a main body 15a, to a base 16 of a disk drive apparatus D. The actuator 15 of this disk drive D is a planar structure suited for use in a single disk system. However, the actuator pivot assembly 10 of the present invention may alternatively connect other actuator constructions, including those used in multi-disk systems.

The shaft 11 is made of aluminum or any other suitable material of sufficient strength and rigidity. It has a round cross-sectional configuration; and, in a first embodiment, a top of the shaft includes a flange 11a and defines a flat top surface 11b that engages the main body 15a of the actuator 15. The flange 11a increases the cross-sectional area of the top surface 11b so that this surface has a greater area than the cross-sectional area of the remaining portion of the shaft 11, thus increasing the area of contact between the shaft 11 and the actuator 15 to securely join these two components together.

The shaft 11 defines a central threaded bore 17 that extends along the longitudinal axis of the shaft 11 and receives a threaded bolt 18 that secures the shaft 11 to the actuator 15. The shaft 11 also defines openings 19 and 20 in the flange 11a. These openings 19 and 20 cooperate with protrusions 21 and 22 in the main body 15a of the actuator 15 to establish proper alignment before insertion of the bolt 18 into the securing shown in FIG. 2. Alternatively, the main body 15a may include openings corresponding to the openings 19 and 20 and separate pins may replace the protrusions 21 and 22.

Alternatively, in a second embodiment, the flange 11a may be eliminated or, even if the flange 11a is maintained, openings 19 and 20 and protrusions 21 and 22 may be eliminated. In addition, the protrusions 21 and 22 could be formed in the flange and the openings 19 and 20 formed in the actuator.

The steps of securing the shaft 11 to the actuator 15 include: placing the actuator 15 and the shaft 11 in positions where the protrusions or pins 21 and 22 extend through the openings 19 and 20 and then placing the bolt 18 through an opening 15b in the actuator 15 and into the bore 17 of the shaft 11.

Figure 4:
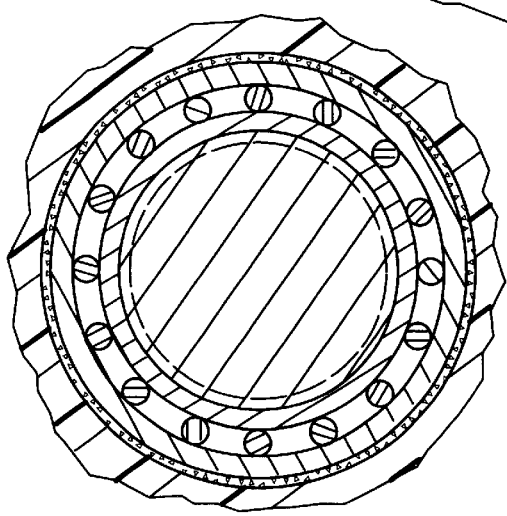
FIG. 4 is a sectional view taken along line 4—4 in FIG. 1 and showing an alternative actuator pivot assembly.

The sleeve 12 includes a shell 23 and the two bearings 13 and 14 that are bonded to the inside of the shell 23 using adhesive (e.g. anaerobic), as shown in FIG. 2. The shell is made out of aluminum or any other suitable material; and it lies fixedly secured, as with adhesive (e.g., anaerobic adhesive) or any other suitable securing means, to the base 16 of the disk drive in a well-type opening 24 in the base 16. Each of the bearings 13 and 14 include an inner and an outer race made of a material such as steel and a plurality of balls made out of a material such as steel and disposed between the two races. The shaft 11 extends into the sleeve 12, fixedly secured, as with adhesive (e.g., anaerobic adhesive) or any other suitable securing means, to the rotatable inner rings or races of the bearings 13 and 14. Alternatively, the shell 23 of the sleeve 12 may be an integral part of the base 16. See FIG. 4. In another alternative, the sleeve is eliminated by machining bearing holding features into the base 16.

While the above description and the drawings disclose and illustrate one embodiment and a modification, one should understand, of course, that the invention is not limited to this embodiment. Those skilled in the art to which the invention pertains may make other modifications and other embodiments employing the principles of this invention, particularly upon considering the foregoing teachings. Therefore, by the appended claims, the applicant intends to cover any modifications and other embodiments as incorporate those features that constitute the essential features of this invention.

What is claimed is:

1. An actuator pivot assembly for pivotally connecting an actuator of a disk drive to a base of the disk drive, said assembly comprising:

a sleeve secured to and separate from the base; and a shaft secured to the actuator, wherein the shaft extends into the sleeve for rotation in the sleeve without extending through the base.

2. The actuator pivot assembly of claim 1, wherein the sleeve includes at least one bearing.

3. The actuator pivot assembly of claim 2, wherein the sleeve includes a bearing at opposite ends of the sleeve, each of the bearings includes an inner moveable race, and the shaft is secured to the inner moveable races.

4. The actuator pivot assembly of claim 3, wherein the sleeve includes a shell, each of the bearings includes an outer movable race, and the shell is secured to the outer movable races.

5. The actuator pivot assembly of claim 1, further comprising a securing member for securing the shaft to the actuator.

6. An actuator pivot assembly for pivotally connecting an actuator of a disk drive to a base of the disk drive, said assembly comprising:

a sleeve secured to and separate from the base;

a shaft secured to the actuator, wherein the shaft extends into the sleeve for rotation in the sleeve, the shaft includes at least one aligning opening, and the aligning opening is in registry with a protrusion of the actuator that extends outwardly of the actuator to facilitate proper alignment between the actuator and the shaft without securing the actuator to the shaft; and a securing member for securing the shaft to the actuator, wherein the securing member is a threaded bolt that extends through an opening in the actuator and into a threaded bore in the shaft, and the securing member contacts and engages the actuator.

7. The actuator pivot assembly of claim 6, wherein the sleeve comprises two bearings and a shell, the two bearings are bonded to an inside of the shell, and the shell extends into but not through a well-type opening in the base and is fixedly secured to the base by an adhesive.

8. An actuator pivot assembly for pivotally connecting an actuator of a disk drive to a base of the disk drive, said assembly comprising:

the actuator;

a sleeve that defines a bore, wherein the sleeve is secured to and separate from the base; and a shaft that is secured to the actuator and extends into the bore for rotation within the bore, wherein the shaft contacts the actuator without extending through the actuator.

9. The actuator pivot assembly of claim 8, wherein the sleeve includes at least one bearing.

10. The actuator pivot assembly of claim 9, wherein the sleeve includes a bearing at opposite ends of the sleeve, each of the bearings includes an inner moveable race, and the shaft is secured to the inner moveable races.

11. The actuator pivot assembly of claim 10, wherein the sleeve includes a shell, each of the bearings includes an outer movable race, and the shell is secured to the outer movable races.

12. The actuator pivot assembly of claim 8, wherein the shaft is secured to the actuator by a securing member.

13. An actuator pivot assembly for pivotally connecting an actuator of a disk drive to a base of the disk drive, said assembly comprising:

the actuator;

a sleeve that defines a bore, wherein the sleeve is secured to and separate from the base; and a shaft that is secured to the actuator and extends into the bore for rotation within the bore, wherein the shaft is secured to the actuator by a securing member, the securing member is a threaded bolt that extends through an opening in the actuator and into a threaded bore in the shaft, the securing member and the shaft contact and engage opposing surfaces of the actuator, the shaft includes at least one aligning opening, and the aligning opening is in registry with a protrusion of the actuator that extends outwardly of the actuator to facilitate proper alignment between the actuator and the shaft without securing the actuator to the shaft.

14. The actuator pivot assembly of claim 13, wherein the sleeve comprises two bearings and a shell, the two bearings are bonded to an inside of the shell, and the shell extends into but not through a well-type opening in the base and is fixedly secured to the base by an adhesive.

15. A method of aligning and securing an actuator of a disk drive and a shaft that pivotally connects the actuator to a base of the disk drive, said method comprising the following steps in the sequence set forth:

providing an actuator that includes a protrusion that extends outwardly thereof;

joining the actuator and the shaft so that the protrusion extends into an opening in the shaft, thereby aligning the actuator and the shaft without securing the actuator to the shaft; and securing the actuator to the shaft.

16. The method of claim 15, wherein the actuator and the shaft are secured together by placing a bolt through a second opening in the actuator and into a third opening in the shaft.

17. The method of claim 16, further comprising the steps of:

providing the actuator with a second protrusion that extends outwardly thereof;

providing the shaft with a fourth opening; and joining the actuator and the shaft so that the protrusion extends into the opening in the shaft and the second protrusion extends into the fourth opening in the shaft without securing the actuator to the shaft.

18. A disk drive, comprising:
a base;
an actuator; and
a shaft that pivotally connects the actuator to the base, wherein one of the shaft and the actuator has a first opening, the other of the shaft and the actuator has a first protrusion, and the first protrusion extends into the first opening to align the actuator and the shaft without securing the actuator to the shaft.

19. The disk drive of claim 18, wherein the shaft is rotatable in the base.

20. The disk drive of claim 18, wherein the shaft has the first opening and the actuator has the first protrusion.

21. The disk drive of claim 18, wherein the actuator has the first opening and the shaft has the first protrusion.

22. The disk drive of claim 21, wherein the shaft further comprises a flange and the first protrusion extends from the flange.

23. The disk drive of claim 21, wherein the actuator has a second opening, the shaft has a third opening, and a bolt is placed through the second opening and into the third opening, thereby securing the actuator to the shaft.

24. The disk drive of claim 23, wherein one of the shaft and the actuator has a fourth opening, the other of the shaft and the actuator has a second protrusion, and the second protrusion extends into the fourth opening to align the actuator and the shaft without securing the actuator to the shaft.

25. The disk drive of claim 24, wherein the shaft has the fourth opening and the actuator has the second protrusion.

26. The disk drive of claim 24, wherein the actuator has the fourth opening and the shaft has the second protrusion.

27. The disk drive of claim 18, further comprising:
a sleeve secured to and separate from the base, wherein the shaft extends into the sleeve for rotation in the sleeve; and
means for securing the sleeve to the base.

28. The disk drive of claim 27, wherein the securing means is an adhesive.

29. The disk drive of claim 28, wherein the adhesive is an anaerobic adhesive.

30. The disk drive of claim 27, wherein the securing means fixedly secures the sleeve to the base.

31. The disk drive of claim 30, wherein the sleeve comprises two bearings and a shell and the two bearings are bonded to an inside of the shell.

32. The disk drive of claim 18, further comprising:
a sleeve secured to and separate from the base, wherein the sleeve comprises two bearings and a shell, the two bearings are bonded to an inside of the shell, the shell is aluminum, the shell is fixedly secured to a well-type opening in the base by an adhesive, and the shaft extends into the sleeve for rotation in the sleeve.

33. The disk drive of claim 32, wherein the adhesive is an anaerobic adhesive.

34. The disk drive of claim 32, wherein each of the bearings includes an inner race, an outer race and a plurality of balls disposed between the races.

35. An actuator pivot assembly for pivotally connecting an actuator of a disk drive to a base of the disk drive, the assembly comprising:
the actuator;
a sleeve that is separate from and not integral with the base, the sleeve extending into a well-type opening in the base;
means for securing the sleeve to the base; and
a shaft secured to the actuator, the shaft extending into the sleeve for rotation in the sleeve.

36. The actuator pivot assembly of claim 35, wherein the securing means is an adhesive.

37. The actuator pivot assembly of claim 36, wherein the adhesive is an anaerobic adhesive.

38. The actuator pivot assembly of claim 35, wherein the base includes a lower surface that underlays the actuator pivot assembly and four peripheral sidewalls that peripherally surround the actuator pivot assembly.

39. The actuator pivot assembly of claim 35, wherein the sleeve has a cylindrical shape and extends substantially the length of the shaft.

40. A disk drive, comprising:
a base that includes a lower surface and four peripheral sidewalls; and
an actuator pivot assembly that includes a sleeve, a shaft and an actuator, wherein the sleeve has a cylindrical shape and is separate from and fixedly secured to the base, the shaft is fixedly secured to the actuator and extends into and is rotatable in the sleeve, and the assembly is disposed above the lower surface and within the peripheral sidewalls.

41. The disk drive of claim 40, wherein the sleeve comprises a bearing.

42. The disk drive of claim 40, wherein the sleeve comprises two bearings and a shell and the two bearings are bonded to an inside of the shell.

43. The disk drive of claim 42, wherein the shell is aluminum.

44. The disk drive of claim 42, wherein the shell is fixedly secured to a well-type opening in the base by an adhesive.

45. The disk drive of claim 44, wherein the adhesive is an anaerobic adhesive.

46. The disk drive of claim 40, wherein the sleeve is fixedly secured to the base by an adhesive.

47. The disk drive of claim 46, wherein the adhesive is an anaerobic adhesive.

48. The disk drive of claim 40, wherein one of the shaft and the actuator has a first opening, the other of the shaft and the actuator has a first protrusion, the first protrusion extends into the first opening, and the first protrusion and the first opening are spaced from an axial center of the shaft.

49. The disk drive of claim 48, wherein the actuator has the first opening and the shaft has the first protrusion.

50. The disk drive of claim 49, wherein the shaft further comprises a flange and the first protrusion extends from the flange.

51. The disk drive of claim 49, wherein the actuator has a second opening, the shaft has a third opening, and a bolt is placed through the second opening and into the third opening of the shaft, thereby securing the actuator to the shaft.

52. The disk drive of claim 51, wherein one of the shaft and the actuator has a fourth opening, the other of the shaft and the actuator has a second protrusion, the second protrusion extends into the fourth opening, and the second protrusion and the fourth opening are spaced from the axial center of the shaft.

53. A disk drive, comprising:
a base having a first bore along an axial axis; and
an actuator pivot assembly comprising
an actuator;
a sleeve fixedly secured to and separate from the base, the sleeve having a second bore along the axial axis; and
a shaft fixedly secured to the actuator, wherein the shaft extends into the sleeve along the second axis for rotation in the sleeve;

wherein the base includes a lower surface that underlays the sleeve and the shaft.

54. The disk drive of claim 53, wherein the sleeve includes a bearing.

55. The disk drive of claim 53, wherein the sleeve includes bearings at opposite ends of the sleeve, wherein each of the bearings includes an inner moveable race and the shaft is secured to the inner moveable races.

56. The disk drive of claim 53, wherein neither of the shaft and the actuator have a protrusion that extends into an opening in the other of the shaft and the protrusion.

57. The disk drive of claim 53, wherein one of the shaft and the actuator has a first opening, the other of the shaft and the actuator has a first protrusion, and the first protrusion extends into the first opening to align the actuator and the shaft without securing the actuator to the shaft.

58. The disk drive of claim 57, wherein the actuator has the first opening, the shaft has the first protrusion, the shaft further comprises a flange and the first protrusion extends from the flange.

59. The disk drive of claim 53, wherein the sleeve is fixedly secured to the base by an adhesive.

60. The disk drive of claim 53, wherein the sleeve has a cylindrical shape and comprises two bearings and a shell and the two bearings are bonded to an inside of the shell.

* * * * *